Aug. 21, 1951 J. J. CHYLE 2,565,296
WELDED EXPANSIBLE BELLOWS
Filed Feb. 12, 1945
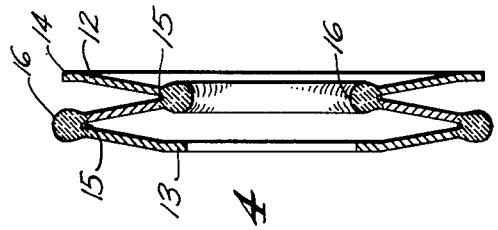
Fig. 4
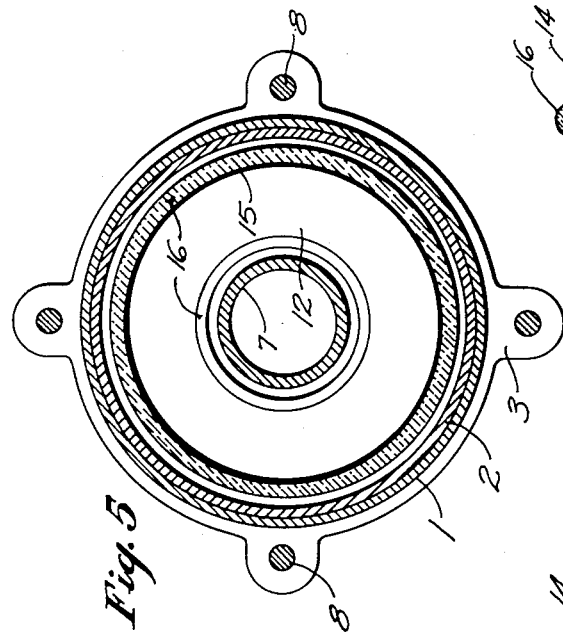
Fig. 5
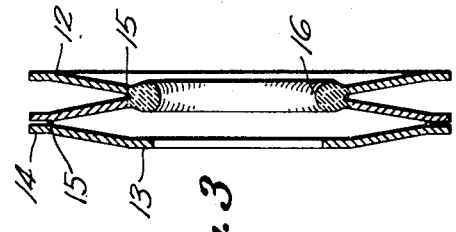
Fig. 3
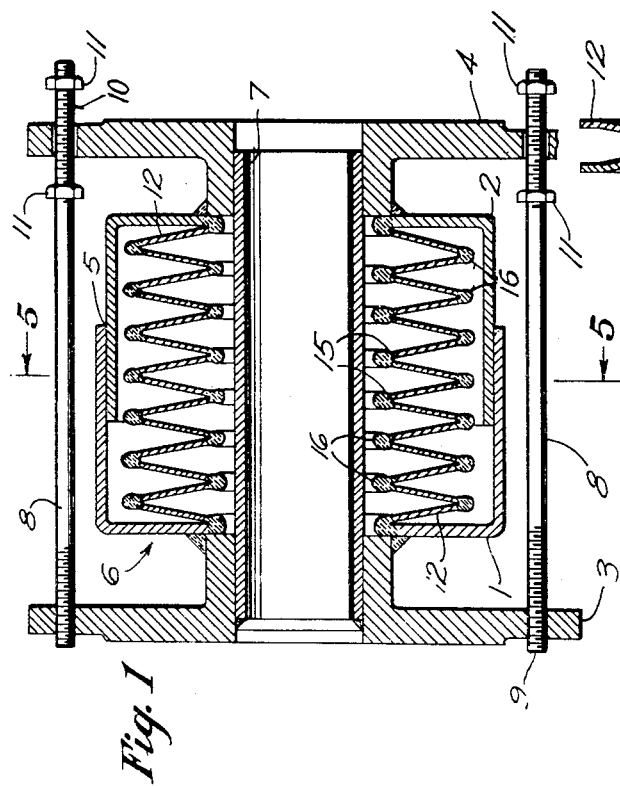
Fig. 2
Fig. 1
INVENTOR.
JOHN J. CHYLE
BY
ATTORNEY Patented Aug. 21, 1951

2,565,296

UNITED STATES PATENT OFFICE 2,565,296

WELDED EXPANSIBLE BELLOWS

John J. Chyle, Wauwatosa, Wis., assignor to A. O. Smith Corporation, Milwaukee, Wis., a corporation of New York Application February 12, 1945, Serial No. 577,422

1 Claim. (Cl. 285—90)

This invention relates to a welded expansible bellows and more particularly to a bellows that may be employed in an expansion joint or the like subject to lineal and lateral movement.

The invention is directed to a bellows unit that is designed to flex within the elastic range of the metal in response to frequent operation and reversals of stress in service.

The present invention has for its object to provide a method of welding the discs of bellows together that provides an expansible bellows which will endure innumerable lineal movements in expanding and contracting in service.

Another object is to provide a method of making a welded expansible bellows that is inexpensive and readily accomplished.

A further object is to provide an expansible bellows that is durable in service with each individual unit having greater flexibility to reduce concentration of stresses.

Another object is to provide an expansible bellows in which the danger of cracks in the welded joints is substantially eliminated.

Another object is to provide a method of making a bellows that develops substantial depth in the weld at the joint areas.

In general the invention comprises the use of spacer elements at the inside line of the welding groove between the respective disc members of the bellows to be joined together to separate the discs during and after welding.

Other objects and advantages of the invention will appear in the following description and accompanying drawing illustrating an embodiment of the invention.

In the drawing:

Figure 1 is a longitudinal sectional view of an expansion joint constructed according to the method of the invention;

Fig. 2 is an enlarged sectional view of one of the disc members of an expansion joint bellows showing two discs assembled for welding at their inside diameters;

Fig. 3 is an enlarged sectional view of disc members welded at their inner diameters and assembled for welding of their outer diameters:

Fig. 4 is an enlarged view similar to Fig. 3 showing the discs after welding of the outer diameters has been completed; and Fig. 5 is a transverse section taken on line 5—5 of Figure 1.

Although the drawing illustrates a welded expansible bellows as employed in an expansion joint and the description is directed to the employment of the bellows with such a joint it is not intended to limit the use of the same as it may well be utilized otherwise.

The expansion joint has a casing of suitable metal comprising two generally cylindrical members 1 and 2 having end flanges 3 and 4 respectively, provided with holes or other attachment means for securement within a pipe line joint.

The inner end portions of members 1 and 2 telescope together to provide a slip joint 5, and the intermediate section of the casing that is formed with the overlap of the members provides a housing for the bellows 6.

A sleeve 7 is suitably secured within one of the casing section members, such as the member 1, and projects into the member 2 where it is free to move longitudinally.

The flanges 3 and 4 of cylindrical members 1 and 2, respectively, are provided with suitable bolt holes at their outer diameters. The bolt holes of flange 3 are longitudinally aligned with those of flange 4, and the bolt 8, as illustrated in Fig. 1 extends from one flange to the other to secure the cylindrical members 1 and 2 together. A plurality of bolts may be employed.

The bolt hole in flange 3 may be threaded to receive the threaded end 9 of the bolt 8. The aligned hole in flange 4 remains unthreaded and this permits free movement of the bolt 8 therein. That portion of bolt 8 which extends through the hole in flange 4 may be provided with threads 10 to receive adjustable nuts 11 disposed on each side of the flange to limit the longitudinal movement of the bolt 8 in flange 4 which in turn limits the relative longitudinal movement of the cylindrical members 1 and 2 of the expansion joint.

Referring now more particularly to the bellows 6, previously specified, the bellows comprise a plurality of discs 12 fabricated from alloy steel having a high yield strength and special corrosion resisting properties. The stresses to which the bellows 6 are subjected in operation by continuous flexing and reversal in stress determines the design and the selection of a proper alloy in order to provide that the metal does not flex beyond its elastic limits.

In manufacturing the bellows 6 according to the method of the invention the discs 12 are first separately formed from flat plates of suitable alloy. The exact shape of the discs may vary, that illustrated being a truncated cone with a transverse inner flange 13 and a similar outer flange 14.

In the forming operation all of the disc members 12 of the bellows are fabricated of the same thickness with the exception of the discs which are disposed at the outer ends of the bellows. These latter discs are about five percent thicker than the inner discs to strengthen the same against higher stresses at the inner diameter of the outer discs as will be more fully described hereinafter. The extra thickness in the outer discs tends to throw the stress to the outer diameter of these discs to equalize the stress throughout.

After the discs are formed as described they are welded together with the thickened discs at the outer end to provide the bellows 6.

In the welding of the discs 12, the inside diameters of two adjacent discs are first welded together before the welding of the outside diameters of the discs.

The welding operation of either the inner or outer diameters of the discs 12 is carried out by initially securing a wire or spacer element 15, as by tack welding, to one of the discs as illustrated in the drawings. It is preferred that the spaced element be secured to the disc 12 that is to be welded to another disc, at a sufficient distance from the edge of the disc to provide a substantial welding groove between the two discs when they are assembled together for welding.

The wire 15 serves to keep the welding groove open and the discs apart until the welding operation is completed. It is preferred that the fusing operation be accomplished by atomic hydrogen welding during which the wire may be entirely melted into the welded joint or remain in the groove to separate the completed weld from the separation line of the discs. In the latter event there is less danger of cracking of the weld by flexing of the discs in service.

The knob-shaped welded joints 16 formed by the fusion of two adjacent flanges 13 or 14 provides a bellows that can withstand innumerable flexing stresses without rupture at the lines of the greatest normal stress in service.

In assembling the completed bellows 6 in the expansion joint with which the invention is described and illustrated, the outer ends of the thick discs 12 of the bellows are welded to the cylindrical housing members 1 and 2 to secure the bellows thereto. It is preferred that the inner diameter of the end discs be welded to the housing, although it may be desirable to fabricate the bellows so that the outer diameter of the respective ends of the bellows may be welded to the housing formed by cylindrical members 1 and 2.

In any event, the end discs 12 that are to be welded in the manner described are fabricated with a greater cross-section than the other portions of the end discs to better withstand the greater stress to which they are subjected.

The housing 1 is welded to the sleeve 7 and the latter cannot move without moving the bellows 6. The movements that sleeve 7 and cylindrical members 1 and 2 may make either laterally or lineally due to misalignment or expansion and contraction of the pipe line joint is absorbed by bellows 6 and prevents injury to the joint.

The invention provides a joint in which the adjacent flanges joined together are slightly spaced so that there is no fine crevice therebetween to cause a splitting of the weld as the bellows flexes. The spacing of the adjacent flanges also prevents any lever action upon the welds resulting from a possible rocking engagement of the flanges when the bellows contracts. This latter is important where there is any tendency for greater compression of the bellows on one side than the other or for uneven engagement of the flanges due to tolerances in construction.

In addition the spacing of the flanges by the wire 15 provides greater heat penetration between the same and they are melted down easier in the welding operation to provide deeper fusion. Thus the weld knob 16 at the periphery of the disc is readily obtained and has sufficient depth. The knob is stiffer and stronger and the concentration of stresses therein is reduced.

Various embodiments of the invention may be employed within the scope of the accompanying claim.

I claim:

In a welded disc type expansible bellows of the class described, a pair of complementary discs having an opening through the centers thereof and having their body portions dished, said discs being disposed to provide an acute angle therebetween in radial section with the apex thereof adjacent the meeting edges of the discs, and a fusion welded joinder of said meeting edges of the discs extending circumferentially of the discs and having spacer metal incorporated at the root of the joint and disposed within the angle of the adjacent faces of the discs and extending circumferentially thereof, whereby said spacer metal protects the fusion welded joint against extension of any incipient crack therein.

JOHN J. CHYLE.

REFERENCES CITED

The following references are of record in the file of this patent:

UNITED STATES PATENTS

| Number | Name | Date |
| --- | --- | --- |
| 1,717,196 | Emmet | June 11, 1929 |
| 1,756,911 | Lee | Apr. 29, 1930 |
| 1,958,260 | Bigger | May 8, 1934 |
| 1,980,561 | Wagner | Nov. 13, 1934 |
| 2,071,583 | Schutt | Feb. 23, 1937 |
| 2,145,937 | Lockwood | Feb. 7, 1939 |
| 2,231,888 | Couch | Feb. 18, 1941 |
| 2,264,282 | Ambrose | Dec. 2, 1941 |
| 2,303,642 | Hoy | Dec. 1, 1941 |

OTHER REFERENCES

The Welding Encyclopedia, ninth edition, published 1938 by The Welding Engineer Publishing Co., Chicago, Ill., page 210. (Copy in Div. 14.)